June 26, 1956 S. B. ALEXANDER 2,752,422

VERTICAL SYNCHRONIZING PULSE SEPARATION SYSTEM

Filed Sept. 6, 1951 2 Sheets-Sheet 1

SAMUEL B. ALEXANDER
INVENTOR.

BY Darby + Darby
ATT'YS

June 26, 1956 S. B. ALEXANDER 2,752,422

VERTICAL SYNCHRONIZING PULSE SEPARATION SYSTEM

Filed Sept. 6, 1951 2 Sheets-Sheet 2

SAMUEL B. ALEXANDER
INVENTOR.

BY Darby + Darby

ATT'YS

United States Patent Office 2,752,422

Patented June 26, 1956

2,752,422

VERTICAL SYNCHRONIZING PULSE SEPARATION SYSTEM

Samuel B. Alexander, New Milford, N. J., assignor to Emerson Radio and Phonograph Corporation, New York, N. Y., a corporation of New York Application September 6, 1951, Serial No. 245,324

2 Claims. (Cl. 178—7.3)

The present invention relates to the art including television and like systems and is more particularly concerned with improvements in circuits for separating vertical synchronizing pulses in such systems.

An important factor limiting the performance of television receivers in areas having weak signals is the departure of the successive fields of the image from synchronization due to impulse noise. As will be understood by those skilled in this art, random noise impulses may have the same effect as vertical synchronizing pulses and cause the cathode ray tube to commence a new field in response to such noise impulses at undesired instants, rather than in response to the vertical synchronizing impulses at the desired times. This, of course, causes a serious distortion of the television reproduction.

This problem is peculiar to the vertical synchronization since horizontal synchronizing circuits have been devised which reduce the effect of such impulse disturbances upon horizontal synchronization almost to the vanishing point. However, the same techniques cannot be conveniently applied to vertical synchronization because of the relatively low field frequency of 60 cycles per second.

In conventional television receivers, synchronizing pulse separation circuits are now in use employing double time constant circuits in the grid circuit of the synchronizing pulse separator tube, thereby simultaneously separating the synchronizing pulses from the composite video signal while also limiting the impulse noise to approximately the same level as the separated synchronizing pulses. The performance of such a circuit may be improved further by an addition of a noise limiter tube ahead of the separator tube.

A disadvantage of such a circuit, however, is that the vertical synchronizing pulses are reduced in amplitude in the output of the separator tube relative to both the horizontal synchronizing pulse amplitude and the noise pulse amplitude, thereby reducing the ratio of vertical synchronizing pulse signal to noise signal and subjecting such receivers to the above-mentioned difficulties of lack of synchronism caused by noise impulses.

The present invention is directed toward improving the ratio of vertical synchronizing pulse signal to noise signal while maintaining the desirable qualities of the conventional synchronizing pulse separator circuit. According to the present invention the vertical blanking pulse which always accompanies the vertical synchronizing pulse, but at a lower amplitude level, is used to establish the vertical synchronizing pulse signal at a voltage level higher than that of the horizontal synchronizing pulse signal and noise signal. The vertical synchronizing pulses appearing at this higher voltage level are then clipped by a vertical synchronizing pulse separator tube to derive an output of vertical synchronizing pulses relatively immune to noise.

As a further feature of the present invention, the vertical synchronizing pulses derived by the present circuit may be used directly without conventional integration, whereby the vertical scanning oscillator is triggered by the first portion of the vertical synchronizing pulse to give more positive triggering action and less interlace difficulties than are encountered with the use of an integrated vertical synchronizing pulse signal as in conventional circuits.

These and other objects and advantages of the present circuit will become more fully apparent from consideration of the following detailed description of a preferred embodiment of the invention taken in conjunction with the accompanying drawings, in which—

Figure 1:
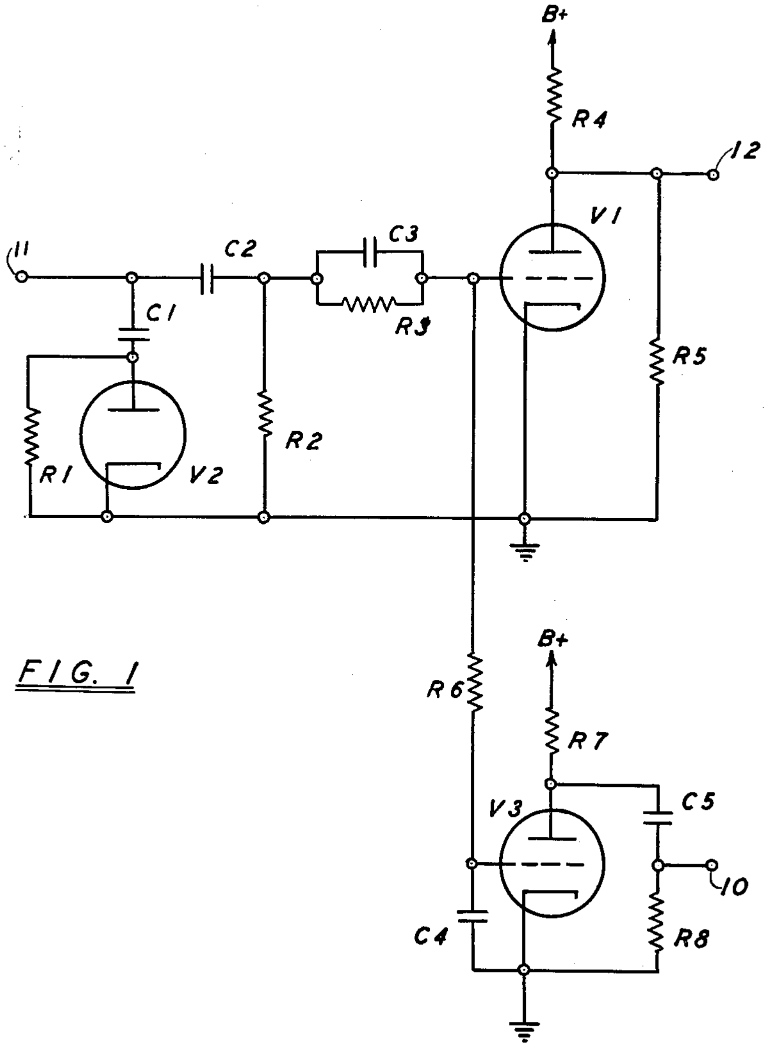
Fig. 1 shows a schematic circuit diagram of the circuit of the present invention.

Referring to Fig. 1, the composite video signal, including both vertical and horizontal synchronizing pulse components and picture components, is applied to the input terminal 11 of the synchronizing pulse separator circuit of the invention, with a polarity such that the synchronizing pulses are positive. Connected between input terminal 11 and ground is a noise clipper circuit comprising a condenser C1 in series with a diode V2, the diode being shunted by the resistor R1. The R-C circuit R1—C1 has a relatively long time constant; for example, C1 may be of the order of .02 microfarad while R1 may be of the order of 3.3 megohms. With this long time constant, C1 is charged substantially to the peak level of the horizontal synchronizing pulses, providing a bias for diode V2 at that level. Any noise pulses exceeding that level will pass through the diode V2 to ground. Accordingly, any noise pulses are limited substantially to the same level as the horizontal synchronizing pulses.

Figure 2:
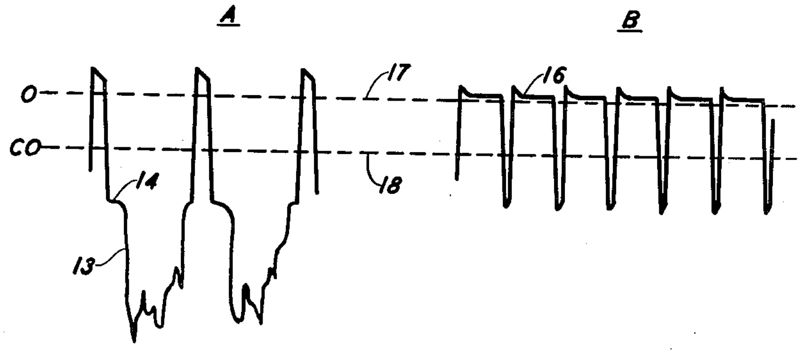
Fig. 2 shows a time graph of the wave form of both the horizontal and vertical synchronizing pulse signals at the input of the synchronizing pulse separator tube.
Figure 3:
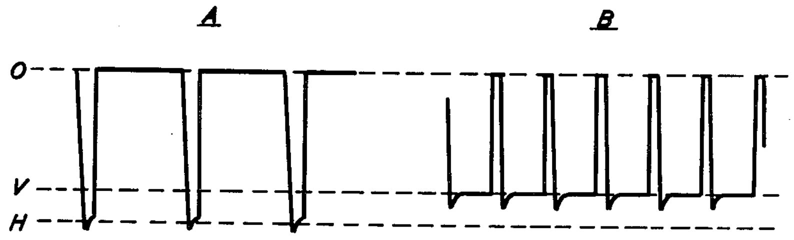
Fig. 3 shows a similar graph of the horizontal and vertical synchronizing pulse signal wave forms at the output of the separator tube.

The noise-clipped signal thus produced is passed through the coupling circuit C2—R2 and the time-constant circuit C3—R3 to the grid of the separator tube VI, which, as will be seen, is used primarily for the purposes of eliminating the picture components. Tube V1 has an anode resistor R4 coupled to B+, and its output is derived from terminal 12 coupled to the anode. The circuit C2—R2 has a time constant considerably less than that of C1—R1, such as of the order of .005 second. C3—R3 have a still smaller time constant such as of the order of .0002 second. The time constant circuit C3—R3 causes the tube V1 to act as a grid leak detector to produce an average bias across the condenser C3, the tube V1 otherwise having no bias. The effect of this circuit on the input and output of V1 is illustrated in Figs. 2 and 3 where wave form A shows the composite video signal for several lines, while wave form B shows the signal during a vertical synchronizing pulse. As shown in Fig. 2A, the composite signal has a picture component 13, a blanking level 14 and a synchronizing pulse 15, these components being of progressively increasing amplitude in the grid circuit of tube V1. The horizontal dash line 17 represents the line of zero grid voltage, while the horizontal dash line 18 represents the cut-off voltage level.

As is well known in grid leak detection, whenever the input signal goes positive, rendering the grid positive relative to its cathode, the tube conducts, drawing current through the grid resistor R3. This produces a volt drop which serves to limit or clip the grid voltage, and also produces a bias across the condenser C3. During the period of the vertical synchronizing pulses, as shown at B, it will be apparent that the grid voltage has a higher average value. This causes a higher average grid bias during this period, which in turn causes the vertical synchronizing pulses to be clipped closer to the zero grid voltage line 17. As shown in Fig. 3, this produces an output horizontal synchronizing pulse level greater than the vertical pulse level.

This effect causes the vertical synchronizing pulses to be more likely to be interfered with by noise impulses, which by clipper V2 have essentially the same level as the horizontal sync pulses. In other words, the vertical synchronizing pulse to noise ratio is impaired. In order to eliminate this effect the present invention provides a further vertical synchronizing pulse separating circuit. Instead of utilizing the output of tube V1 to control the vertical synchronizing circuits as well as the horizontal synchronizing circuits, the output of tube V1 actuates only the horizontal synchronizing pulse circuit which is more immune to noise pulses and which has a greater signal to noise ratio, and a further tube V3 is used for vertical pulse separation. This tube V3 has its input grid coupled to the input grid of tube V1 by means of a low pass filter circuit formed by resistor R6 and capacitor C4. Capacitor C4 has a very small capacitance such as the order of 47 micromicrofarads while resistor R6 is of the same order of magnitude as R2, such as 100 kilohms. In this way, the input to the filter circuit R6—C4 is the same as that applied to the grid of V1, and is shown in Fig. 2. This low pass filter circuit raises the level of the vertical blanking pulse relative to the horizontal blanking and synchronizing pulses, as is shown in Fig. 4A. Since noise pulses have been clipped to the horizontal synchronizing pulse level, the vertical blanking pulses are therefore above the noise level. The vertical synchronizing pulses are at still higher level since, as shown in Fig. 4A at 24, they sit on the blanking pulses. Hence a greatly improved noise immunity is afforded by this increase in signal-to-noise ratio for the vertical synchronizing pulses at the input to tube V3.

Figure 4:
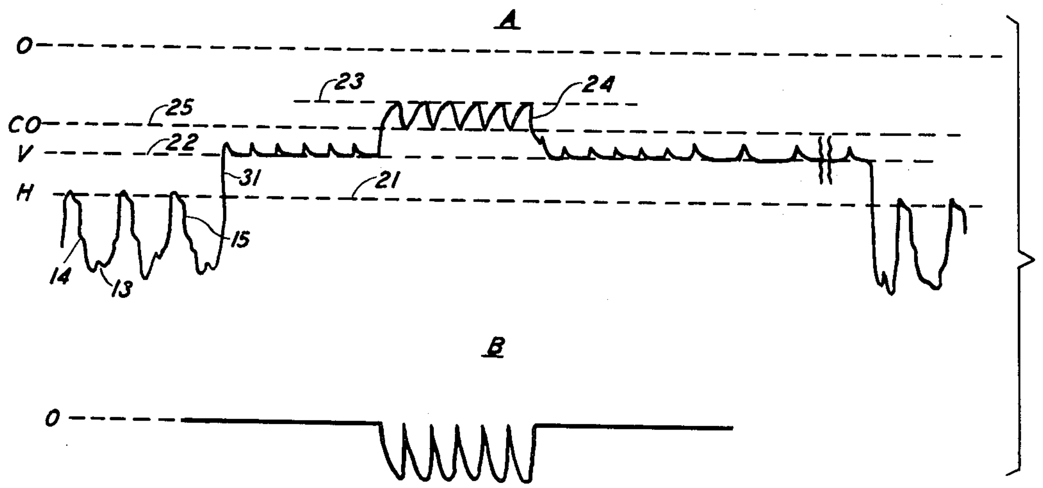
Fig. 4 shows a pair of time graphs of the wave forms respectively at the input and output of the vertical synchronizing pulse separator tube.

In addition, tube V3 cuts out the signal at the level of the vertical blanking pulses or below. This cuts out the undesirable noise pulses which might improperly trigger the vertical sweep circuits, since such noise pulses have been caused to have a level below that of the vertical blanking pulses. This is illustrated in Fig. 4 where at A is shown the wave form appearing at the grid of tube V3 for a period of the vertical synchronizing pulse and for a short period before and after. As indicated, the level 21 of the horizontal sync pulses 15 is lower than the level 22 of the vertical blanking pulse 31 which in turn is lower than the level 23 of the vertical synchronizing pulse 24. The cutoff level for the tube V3 however is as shown at 25, which permits only the vertical synchronizing pulses 24 to pass through to the output of tube V3, as indicated in Fig. 4B. This elevation of the level of the vertical synchronizing pulses relative to the horizontal synchronizing pulses correspondingly increases the signal to noise ratio for the vertical synchronizing pulses, since the noise pulse level by virtue of noise clipper tube V2 is substantially at the horizontal synchronizing pulse level. Accordingly, the output pulses derived from tube V3 have greatly improved signal to noise ratio, which provides greater noise immunity for the vertical synchronizing circuit. This cut-off action is provided by operating tube V3 in a "starvation" circuit, with the plate voltage supplied to the anode through a high impedance such as R7, which may be of the order of 10 megohms. The output is derived from terminal 10 coupled to the anode of V3 by a coupling circuit C5 and R8. R8 is a relatively low resistor such as of the order of 150 ohms. C5 and R7 provide a long time constant circuit which stabilizes the plate voltage while permitting the cut-off bias of the tube to adjust automatically for the changes in D. C. level of grid bias voltage developed by tube V1.

The output of tube V3 is, of course, supplied to the conventional vertical synchronizing circuit used in the receiver. As a further feature, the output vertical synchronizing pulse appears as in Fig. 4B with a series of serrations. Conventionally these serrations are integrated for separation from the horizontal synchronizing pulses. However, no such integration is necessary in the present case, since both noise immunity and inter-sync separation is afforded by the circuit itself. Therefore, the vertical scanning oscillator may be triggered directly by the first serration of the vertical synchronizing pulse, without integration, which gives more positive triggering action and less interlace difficulties than when using a vertical synchronizing pulse integrator.

While the above description relates to a specific embodiment of the present invention, it is to be understood that it is illustrative only, since the present invention may be incorporated in apparently widely varying forms without departing from the scope thereof. For example, although tubes V1 and V3 are illustrated as triodes, they may equally well be tetrodes, pentodes or other multiple grid tubes.

What is claimed is:

1. In a television receiver circuit having a synchronizing signal separator circuit with an input to which is applied a composite signal having picture components, vertical and horizontal synchronizing components and noise impulses limited to an amplitude no greater than said synchronizing components, said separator circuit producing a negative bias voltage at its input corresponding to the peak amplitude of said synchronizing components, the improvement comprising circuit means coupled to the input of said separator circuit and also supplied with said noise-limited composite signal and said bias for attenuating said picture components, horizontal synchronizing components and noise impulses to a greater extent than said vertical components to provide an output signal having relatively accentuated vertical synchronizing components, said circuit means also having isolating means providing a direct current path for said bias whereby said output signal also has said bias as a component thereof, a vertical separator tube directly coupled to said circuit means output to have said accentuated signal and said bias applied thereto, means including a very large output resistor connected in series with the anode of said vertical separator tube for producing a large change in anode potential in response to a small anode current, and a condenser coupled between said anode and ground and having with said resistor a time constant long compared to the recurrence frequency of said vertical synchronizing components, whereby said vertical separator tube will pass said vertical components and suppress the remainder of said composite signal.

2. In a television receiver, a source of composite signal having picture components, horizontal synchronizing components, vertical synchronizing components, and noise impulses limited in amplitude to that of said horizontal synchronizing components, means comprising a horizontal separator tube having an input coupled to said source to have said composite signal applied to said input for passing only said synchronizing components and for producing a negative bias at said input corresponding to the peak amplitude of said synchronizing components, means, including a low-pass filter circuit directly coupled to said separator tube input to have said composite noise-limited signal and said bias applied thereto, for producing a combined output composite signal and bias with said vertical synchronizing components accentuated relative to said horizontal synchronizing components and also for providing impedance isolation for said horizontal separator tube input, a vertical-component separator tube directly coupled to the output of said last means to have said vertical-component-accentuated signal and bias applied thereto and having an anode, means including a very large load resistor coupled to said anode for reducing the anode voltage of said tube by a large amount in response to but a small anode current, and a condenser coupled between anode and ground and having with said resistor a time-constant which is large compared to the periodicity of said vertical synchronizing components.

References Cited in the file of this patent

UNITED STATES PATENTS

| | | |
|---|---|---|
| 2,151,526 | Poch | Mar. 21, 1939 |
| 2,221,069 | Andrieu | Nov. 12, 1940 |
| 2,304,713 | Smith | Dec. 8, 1942 |
| 2,383,420 | Scoles | Aug. 21, 1945 |
| 2,463,735 | Bedford | Mar. 8, 1949 |
| 2,515,763 | Downie | July 18, 1950 |
| 2,515,597 | Haantjes | July 18, 1950 |
| 2,625,603 | Gruen et al. | Jan. 13, 1953 |
| 2,631,230 | Marsh | Mar. 10, 1953 |
| 2,637,774 | Avins | May 15, 1953 |